United States Patent Office 2,823,420
Patented Feb. 18, 1958

2,823,420

MANUFACTURE OF CORK COMPOSITION PRODUCTS

Russell W. Heiges and William R. Reed, Pittsburgh, Pa., assignors to Armstrong Cork Company, Lancaster, Pa., a corporation of Pennsylvania No Drawing. Application July 2, 1956
Serial No. 595,094

12 Claims. (Cl. 18—48)

This invention relates to the manufacture of cork composition products. The invention is particularly important in the field of cork tile manufacture, and the specification will be directed especially to the production of that product as a typical embodiment of the invention.

In the manufacture of cork tile, a mass of cork granules is thinly coated with a water-resistant binder, such as an A-stage phenolic resin. The binder-coated granules are disposed in a mold and are compressed therein. The compressed mass is heated to activate the phenolic binder. The mass is allowed to remain in the mold during a period required for stress relaxation of the cork granules, after which the mass is extracted from the mold as a large block. This block is cut into sheets which are fabricated into tiles of the desired dimensions. The upper surface of the tiles is generally sanded and then coated with wax or other protective coating to provide a smooth, wear-resistant surface.

One of the major problems encountered in cork tile manufacture is the matter of segregation of the cork granules during handling of the mix prior to bonding of the granules into a block. This incidentally is a problem of substantial magnitude in cork composition manufacture generally. It is not peculiar to cork tile manufacturing operations.

Cork tile is formed of cork granules which vary in size; a commonly used mixture includes a portion of large granules ranging in size from ½ inch to about 10 mesh and a portion of smaller granules ranging in size from 10 to 20 mesh. Generally there is a much greater proportion of the cork granules of the larger sizes than the smaller sizes. Some small granules are desirable to fill in between the larger granules when the mass is molded into a block, to provide a closed product, free of surface voids or pits.

During conveying of a batch of cork granules of this character from the mixer, where the binder is applied, to the molding station, the smaller or finer granules will tend to migrate to the bottom of the mass, with the coarser granules being disposed at the top. A similar action occurs in other handling operations before charging of the mass into the mold. A substantial amount of particle segregation also occurs during charging of the granules into the mold for compression and binder activation. As the mass is charged into the mold, the finer granules tend to fall toward the bottom of the mold and the larger granules remain on top, building up in cone fashion and falling off at the edges as the cone builds up.

The result of this segregation of the cork granules is finished tiles which are not uniform in appearance. Some of the tiles are predominantly formed of large cork granules and others are formed essentially of small cork granules. The visual appearance of the tiles differs greatly and, when the tiles are installed on a floor, there is too great a contrast in appearance among the tiles.

Also, this particle segregation results in the formation of a block which contains many voids between adjacent large cork granules. The finer cork granules are provided in the mix to fill in between the coarse granules and form a "tight" or "closed" block which when severed into tiles will be as free as possible of pits or voids at the surface.

There are also bonding problems which are aggravated by particle segregation. The binder is applied as a very thin layer over all of the cork granules; and when segregation occurs, the bottom of the block contains a disproportionate amount of the finer granules and consequently a larger volume of binder than the area of the block adjacent to the top where the larger sized granules predominate. As a result, the tiles severed from the upper portions of the block are weak—poorly bonded. High scrap losses follow.

Another problem which arises through particle segregation is one of uniform stress relaxation of the cork granules. Where one portion of the block is predominantly formed of large size granules and another portion of smaller sized granules, the portion containing the large size granules may not be fully stress-relaxed at the time the block is severed into tiles. This then releases the stresses in the material and the cork granules will puff up slightly, providing an irregular surface made up of slightly domed cork granules.

Particle segregation also causes stresses within the block which result in warping of the tile when such stresses are released upon severance of the block into tiles.

Where the mass in the mold is dielectrically heated, there is the problem of uniform heating by the dielectric effect. Where the binder ratio is high, as it is at the bottom and center of the mold when particle segregation occurs, the dielectric loss factor of the mass will be different in the areas where there is more binder present than in the other areas where there is less binder and nonuniform dielectric heating and binder activation will result. The portion where the finer granules are concentrated will have a tendency to be overheated, and the portions where the larger granules are concentrated will be undercured.

The present invention is directed to this problem of particle segregation in cork composition manufacture. According to the invention, the cork granules of varying size which constitute the major portion of the volume of the mix are thinly coated in the conventional manner with a suitable binder including a primary binder component which is essentially tack-free, such as the commonly used phenolic resin material. There is incorporated into the mix a material which provides a temporary "tack" which is adequate to cause the fine granules to cling to the large granules, but inadequate to cause the mass to be self-adherent. The large granules, with smaller granules clinging thereto, are essentially independent units and may be observed as such during the final stages of mixing, conveying, and mold charging.

The temporary tack producing material should preferably be compatible with the binder for the cork granules; and, where phenolic resin is used as the binder, the material should not adversely affect the curing of the binder. Of course, the material should not deleteriously affect the cork granules. A material well suited for the purpose is urea resin, activated with an acid which provides a material having a good, but temporary, tack which is effective for holding the fine granules in clinging relationship with the larger granules but does not cause the large granules to adhere to one another.

The reaction, if any, involved between the binder and the temporary tack producing material is not fully understood. The physical result, however, is immediately observable, for the fine cork granules can be seen clinging to the larger granules, as noted above.

The following example illustrates the invention as applied to the manufacture of a block of cork composition suitable for fabrication into cork tiles, all parts being given by weight:

| | Parts |
|---|---|
| Ground cork (½" to 10 mesh) | 185.0 |
| Ground cork (10–20 mesh) | 30.0 |
| Phenolic resin (70% solids) | 13.2 |
| Urea-aldehyde resin (70% solids) | 5.1 |
| Catalyst for the phenolic resin | 1.3 |
| Hydrochloric acid (38% concentration) | .2 |

A typical screen analysis for the cork component of the above example is as follows:

½" to 10 mesh component

| Sieve size: | Percent retained |
|---|---|
| .525" | 0.0 |
| .371" | 1.0 |
| #3 | 30.0 |
| #4 | 40.5 |
| #8 | 25.0 |
| #10 | 2.5 |
| #20 | 1.0 |
| Pan | Trace |

10 to 20 mesh component

| Sieve size: | Percent retained |
|---|---|
| #8 | Trace |
| #10 | 3 |
| #14 | 35 |
| #20 | 55 |
| #30 | 5 |
| #40 | 1 |
| Pan | 1 |

In the preparation of the cork composition, the phenolic resin, a liquid A-stage resin or resol, is placed in a mixing kettle. The urea-aldehyde resin, a partially reacted urea-formaldehyde resin, is added to the phenolic resin.

This mixture is then spread thinly over the cork granules, and thereafter a mixture of the phenolic resin catalyst (paratoluenesulphonic acid, .44 parts; water, .44 parts; and alcohol, .44 parts, for example) and the hydrochloric acid for chemical activation of the urea resin is added to the binder coated cork granules. This mixture is preferably added in essentially a dropwise manner. Within a few minutes' time, the fine granules will be observed clinging to the larger granules, as noted above. Thereupon, the mix may be discharged from the mixer and conveyed to the molding station.

The mass of binder coated cork granules may be charged into a mold and compressed to a density in the order of 25 to 32 pounds per cubic foot. Curing may be effected in conventional ovens or by dielectric heating. After appropriate heating to activate the binder and after the necessary stress relaxation of the cork granules has been effected, the mass may be removed from the mold and later severed into tiles.

It is preferred to have the mixing substantially complete, with the binder and the latent tack producing material uniformly spread over the cork granules and the granules of various sizes substantially uniformly interspersed before the activator is added to the mix. Mixing may then be continued during the interval necessary to develop adequate tack to hold the small granules in clinging relationship with the large granules.

Instead of urea-aldehyde resin, other similar amino-aldehyde resins, such as melamine-formaldehyde, or mixtures of various amino-aldehyde resins may be used.

In place of hydrochloric acid, sulfuric acid, phosphoric acid, paratoluenesulphonic acid, and the like, and mixtures thereof, may be substituted. Concentrated sulfuric acid reacts very rapidly; and phosphoric acid, even when in concentrated form, reacts rather slowly. Diluted sulfuric acid serves quite well, and a dilution of hydrochloric and sulfuric acids will also be useful.

Mixing should continue until the desired temporary tack has developed within the binder system, through the urea resin-acid reaction, to insure that the fine granules which are uniformly distributed throughout the mass in the mixing operation will cling to the larger granules. Thereafter, the mass may be discharged to operations where particle segregation normally would occur.

The kind and quantity of the acid used with the amino-aldehyde resin will depend to some extent upon the processing time. It has been found that the desired temporary tack in the urea resin-acid combination, when forming part of a phenolic resin binder system, gradually diminishes; and, after a period of about half an hour, the binder system will behave about the same as a conventional phenolic resin binder and particle segregation again will occur. With a mixing time of about five minutes after addition of the acid and a processing time of about five minutes from discharge of the batch from the mixer to changing of the mold (a continuous mixing and processing operation is generally employed), an amount of hydrochloric acid equivalent to about 4% of the weight of the urea-aldehyde resin used will give good results. There will be no difficulty experienced in determining the quantity of acid to add, provided the mixing and processing times are taken into account. For most practical purposes, about 2% to 5%, based on the urea-aldehyde resin, will be adequate with hydrochloric acid, depending upon mixing and processing times. The amount of acid added should not be sufficient to deleteriously affect the curing cycle for the cork composition. Where paratoluenesulphonic acid is used both for activating the phenolic resin and imparting temporary tack to the urea resin, the proportioning will be adequate to provide for both functions of the acid.

The quantity of amino-aldehyde resin added to the binder may be varied over wide limits. Normally a range within about 20 to 50 parts for each 100 parts of phenolic binder will be adequate. For some products, it is desirable to keep the quantity of urea resin as low as practicable. In others, its presence is not objectionable.

While the problem of particle segregation is particularly acute in cork tile manufacture where a phenolic binder is used and a component of fine cork granules is used with a major component of larger cork granules, the problem also exists in other cork composition products with the same or other binders and with more conventional cork granule sizes, such as 10 to 20 mesh, 20 to 30 mesh, or the like.

The activated amino-aldehyde resin temporary tack producing material is preferred, as mentioned above. However, the invention is not limited thereto. Comparable results may be achieved by employing as the temporary tack producing material a combination of glue, urea, and water and activating this composition by the addition of paraformaldehyde. The mixing procedure may be the same as in the example above, with the paraformaldehyde being added to the mix just prior to discharging of the mass from the mixer. An adequate tack is produced in a relatively short time and one which persists for a period fully adequate to permit the usual handling and mold charging operations. This temporary tack producing material is not recommended for cork tile production, but for other cork composition products.

The presence of glue is not desirable in a floor or wall tile composition where mold growth may be a factor. Where the cork composition is to be used as an automotive gasket, for example, this material may be substituted for the preferred material of the specific example.

Other temporary tack producing material may be used, provided the tack persists long enough to permit proper mixing, processing, and mold charging without objectionable particle segregation, as set out above.

By practice of the present invention, particle segregation is controlled, even in the severe case of cork composition for cork tile manufacture, where a component of fine cork granules is used with the major component of larger cork granules and where particle segregation has been a major problem, as mentioned in the forepart of this specification.

We claim:

1. In a method of making molded products from cork granules of varying sizes, the steps comprising thinly coating a mass of cork granules which vary in size with a binder system which is essentially tack-free including a primary binder component which is essentially tack-free and will not prevent particle segregation and a secondary resinous component which is potentially tack producing and may be chemically activated to produce a tack to hold said finer granules in clinging relationship with the larger of said granules and avoid particle segregation and which is inadequate to cause the mass of said granules to be essentially self-adherent, thereafter distributing onto said binder coating on said granules a chemical activator to activate said secondary component on said granules, holding said finer granules in clinging relationship with said larger granules through the intermediary of said chemically activated secondary resinous component, charging said granules into a mold while said tack persists and said granules are essentially uniformly interspersed, and molding said mix under pressure to bond said granules under compression into a cork composition block which is essentially free of particle segregation.

2. In a method of making molded products from cork granules of varying sizes, the steps of claim 1 in which the primary binder component comprises a heat reactive phenolic resin and the secondary component constitutes about 20 to 50 parts by weight for each 100 parts by weight of the primary binder component.

3. In a method of making molded products from cork granules of varying sizes, the steps of claim 1 in which the secondary component comprises a reactive amino-aldehyde resin and the chemical activator is selected from the group consisting of hydrochloric acid, sulfuric acid, phosphoric acid, paratoluenesulphonic acid, and mixtures thereof.

4. In a method of making molded products from cork granules of varying sizes, the steps of claim 2 in which the secondary component comprises a reactive urea-aldehyde resin and the activator comprises hydrochloric acid.

5. In a method of making molded products from cork granules of varying sizes, the steps of claim 4 in which the hydrochloric acid activator is present in the range of 2% to 5% of the weight of the urea-aldehyde resin.

6. In a method of making molded products from cork granules of varying sizes, the steps of claim 5 in which the cork granules are in two components, the major component by volume having an average particle size which is substantially larger than the average particle size of the other component.

7. In a method of making molded products from cork granules of varying sizes, the steps comprising forming a mix by thinly coating a mass of said granules with a binder system including as a primary component a reactive phenolic resin which is essentially tack-free and as a secondary component a mixture of glue and urea which provides a tack in said binder system which is adequate to hold the finer of said granules in clinging relationship with the larger of said granules and inadequate to cause the mass of granules to be essentially self-adherent, adding formaldehyde to the mix after said granules have been thinly coated with said binder system and have been essentially uniformly interspersed throughout the mix with said finer granules disposed in clinging relationship with said larger granules, charging said mix into a mold while said tack persists, and molding said mix under heat and pressure.

8. In a method of making molded products from cork granules of varying sizes, the steps comprising adding to a mass of said granules a binder system which is essentially tack-free including an essentially tack-free reactive phenolic resin binder and an essentially tack-free partially reacted amino-aldehyde resin which when chemically activated provides a temporary tack in said binder system at mixing temperature, agitating said granules to thinly coat the same substantially uniformly with said essentially tack-free binder system, thereafter distributing onto said binder coating on said granules a chemical activator for said amino-aldehyde resin to provide a temporary tack in said binder system at mixing temperature which is adequate to hold the finer of said granules in clinging relationship with the larger of said granules and inadequate to cause the mass of granules to be essentially self-adherent, essentially uniformly interspersing said granules to bring said finer granules into said clinging relationship with said larger granules and avoid particle segregation, and thereafter while said tack persists charging said mix into a mold and molding the mass under heat and pressure.

9. In a method of making molded products from cork granules of varying sizes, the steps of claim 1 in which the secondary component comprises a partially reacted amino-aldehyde resin.

10. In a method of making a molded product from a mixture of cork granules of varying sizes, the steps comprising thinly coating a mass of said granules with a binder system which is essentially tack-free and which includes as a primary component a reactive phenolic resin and as a secondary component a resinous tack-producing material which, when chemically activated, provides a temporary tack in said binder system, thereafter distributing onto said binder coating on said granules a chemical activator for said resinous tack-producing material to activate the same on said granules and provide a tack which is adequate to hold the finer of said granules in clinging relationship with the larger of said granules and inadequate to cause the mass of granules to be essentially self-adherent, intermixing said mass of granules to bring said finer granules into said clinging relationship with said larger granules and avoid particle segregation, and thereafter while said tack persists and said granules are disposed in said clinging relationship charging said mix into a mold and molding the mass under heat and pressure.

11. In a method of making a molded product from a mixture of cork granules including a major portion by volume of large size granules and a minor portion by volume of relatively finer cork granules adapted to fill the void spaces between the larger cork granules when the mass is molded, the steps comprising thinly coating a mass of said granules with a binder system which is essentially tack-free and which includes as a primary component a reactive phenolic resin and as a secondary component a partially reacted urea-aldehyde resin which, when chemically activated, provides a temporary tack in said binder system, thereafter distributing onto said binder coating on said granules a catalyst for the reactive phenolic resin and an acid activator for said urea-aldehyde resin to activate the same on said granules and provide a tack which is adequate to hold the finer of said granules in clinging relationship with the larger of said granules and inadequate to cause the mass of granules to be essentially self-adherent, intermixing said mass of granules to bring said finer granules into said clinging relationship with said larger granules and avoid particle segregation, and thereafter while said tack persists and said granules are disposed in said clinging relationship charging said mix into a mold and molding the mass under heat and pressure.

12. In a method of making a molded product from a mixture of cork granules of varying sizes, the steps of claim 11 in which the urea-aldehyde resin is incorporated in a quantity equal to 20 to 50 parts by weight for each 100 parts by weight of phenolic resin and the acid activator for the urea-aldehyde resin is incorporated in a quantity equal to 2% to 5% of the weight of the urea-aldehyde resin.

References Cited in the file of this patent

UNITED STATES PATENTS

| | | |
|---|---|---|
| 2,131,314 | Cooke | Sept. 27, 1938 |
| 2,719,329 | Gard | Oct. 4, 1955 |